United States Patent
Wang et al.

(10) Patent No.: US 9,195,333 B2
(45) Date of Patent: Nov. 24, 2015

(54) FLAT PANEL DISPLAY DEVICE

(71) Applicant: Samsung Display Co., Ltd., Yongin, Gyeonggi-Do (KR)

(72) Inventors: Seong-Min Wang, Yongin (KR); Mu-Gyeom Kim, Yongin (KR)

(73) Assignee: SAMSUNG DISPLAY CO., LTD. (KR)

( * ) Notice: Subject to any disclaimer, the term of this patent is extended or adjusted under 35 U.S.C. 154(b) by 133 days.

(21) Appl. No.: 14/026,617

(22) Filed: Sep. 13, 2013

(65) Prior Publication Data

US 2014/0362304 A1 Dec. 11, 2014

(30) Foreign Application Priority Data

Jun. 10, 2013 (KR) .......................... 10-2013-0065809

(51) Int. Cl.
*G02F 1/1335* (2006.01)
*G06F 3/041* (2006.01)
*G02F 1/1333* (2006.01)

(52) U.S. Cl.
CPC .......... *G06F 3/0412* (2013.01); *G02F 1/13338* (2013.01)

(58) Field of Classification Search
CPC ... G02F 1/13338; G06F 3/0412; G06F 3/045; G06F 3/046; G06F 3/047
See application file for complete search history.

(56) References Cited

U.S. PATENT DOCUMENTS

| | | | |
|---|---|---|---|
| 2006/0017862 A1* | 1/2006 | Song et al. | 349/42 |
| 2006/0125971 A1* | 6/2006 | Abileah et al. | 349/42 |
| 2006/0209039 A1 | 9/2006 | Destura et al. | |
| 2008/0186259 A1* | 8/2008 | Todorokihara et al. | 345/76 |
| 2010/0182282 A1* | 7/2010 | Kurokawa et al. | 345/175 |
| 2012/0242610 A1* | 9/2012 | Yasumatsu | 345/173 |
| 2014/0300251 A1* | 10/2014 | Colli et al. | 310/339 |

FOREIGN PATENT DOCUMENTS

| | | |
|---|---|---|
| KR | 1020060056333 A | 5/2006 |
| KR | 1020110017674 A | 2/2011 |
| KR | 1020110098304 A | 9/2011 |

* cited by examiner

*Primary Examiner* — Michael Caley
(74) *Attorney, Agent, or Firm* — Cantor Colburn LLP

(57) ABSTRACT

A flat panel display device includes a plurality of scan lines elongated in a direction, a plurality of data lines elongated to intersect the scan lines, a plurality of pixel devices respectively coupled to the plurality of scan lines and the plurality of data lines, a plurality of first sensing lines elongated parallel to the scan lines, a plurality of second sensing lines elongated parallel to the data lines, and a plurality of sensing devices respectively coupled to the plurality of first sensing lines and the plurality of second sensing lines.

14 Claims, 3 Drawing Sheets

FLAT PANEL DISPLAY DEVICE

This application claims priority to Korean Patent Application No. 10-2013-0065809, filed on Jun. 10, 2013, and all the benefits accruing therefrom under 35 U.S.C. §119, the entire contents of which are incorporated herein by reference in their entirety.

BACKGROUND

1. Field

The invention relates to a flat panel display device, and more particularly, to a flexible flat panel display device.

2. Description of the Related Art

Techniques have been developed to use a flexible substrate including glass, plastic, metal, etc. material. The flexible substrate is not only light in weight and strong against impact, but also deformable such that the flexible substrate is bendable. Hence, the flexible substrate is suitable for a display device of an electronic device such as a portable terminal, etc.

A touch screen panel has been applied to a flat panel display device such as a liquid crystal display ("LCD") device or an organic light emitting display ("OLED") device. The touch screen panel is a device that enables a user to input a command by contacting the touch screen panel with an object such as a hand or a pen. Since the touch screen panel can provide several conveniences to the user, an application range of the touch screen panel has been extended do a number of electronic devices including but not limited to display devices.

As the performance of a portable terminal has been improved, several application programs are executed or used by the portable terminal. However, an input device for the increasing number of application programs used with the portable terminal has been limited. Therefore, there remains a need for an improved input device which provides a user with greater convenience in using an electronic device.

SUMMARY

One or more exemplary embodiment provides a flat panel display device capable of improving user input thereto.

One or more exemplary embodiment also provides a flat panel display device capable of recognizing a user's command through a changed position or shape thereof.

According to an exemplary embodiment of the invention, there is provided a flat panel display device, including: a plurality of scan lines elongated in a direction; a plurality of data lines elongated to intersect the scan lines; a plurality of pixel devices respectively coupled to the plurality of scan lines and the plurality of data lines; a plurality of first sensing lines elongated parallel to the scan lines; a plurality of second sensing lines elongated parallel to the data lines; and a plurality of sensing devices respectively coupled to the plurality of first sensing lines and the plurality of second sensing lines.

A pixel device may include a first electrode; an organic light emitting layer disposed on the first electrode; and a second electrode disposed on the organic light emitting layer. Alternatively, the pixel device may include a first electrode; a liquid crystal layer disposed on the first electrode; and a second electrode disposed on the liquid crystal layer.

The sensing device may include a first electrode coupled to a first sensing line; a piezoelectric layer disposed on the first electrode; and a second electrode disposed on the piezoelectric layer and coupled to a second sensing line.

The piezoelectric layer may include at least one material selected from poly vinylidene fluoride ("PVDF"), PVDF-co-trifluoroethylene ("TrFE"), TrFE, polyurea, polyimide and nylon. Alternatively, the piezoelectric layer may include at least one material selected from $BaTiO_3$ and lead zirconate titanate ("PZT").

A thickness of the piezoelectric layer may be in a range from about 0.1 micrometer (μm) to about 0.3 μm.

One of the first and second electrodes of the sensing device may be disposed on the same plane as the first electrode of the pixel device. The first and second electrodes of the sensing device may be overlapped with the second electrode of the pixel device.

The flat panel display device may further include a sensing unit coupled to the plurality of first sensing lines and the plurality of second sensing lines.

The flat panel display device may further include a scan driver coupled to the plurality of scan lines; and a data driver coupled to the plurality of data lines. The scan driver or the data driver may include a portion of the sensing unit.

The plurality of first sensing lines and the plurality of second sensing lines may include a transparent conductive material. The transparent conductive material may include at least one material selected from silver (Ag) nano tube, Ag nano wire, carbon nano tube ("CNT"), graphene, indium tin oxide ("ITO"), indium zinc oxide ("IZO"), gallium indium zinc oxide ("GIZO"), indium tin zinc oxide ("ITZO"), hafnium indium zinc oxide ("HfIZO"), Ag, MgAg and YbAg.

The flat panel display device may be a flexible flat panel display device.

BRIEF DESCRIPTION OF THE DRAWINGS

Exemplary embodiments will now be described more fully hereinafter with reference to the accompanying drawings, in which.

DETAILED DESCRIPTION

Figure 1:
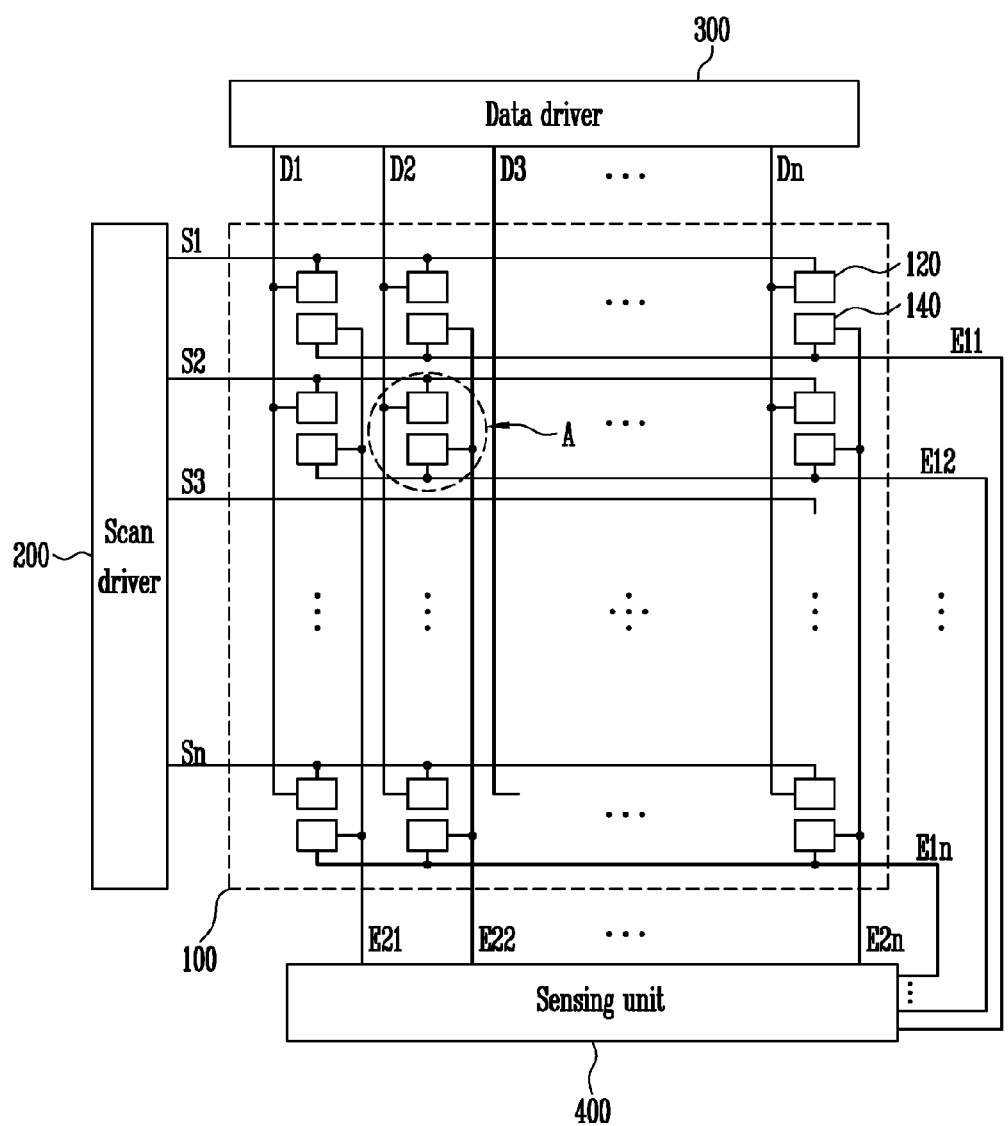
FIG. 1 is a schematic plane view of an exemplary embodiment of a flat panel display device according to the invention.

Exemplary embodiments will now be described more fully hereinafter with reference to the accompanying drawings; however, the invention may be embodied in different forms and should not be construed as limited to the exemplary embodiments set forth herein. Rather, these exemplary embodiments are provided so that this disclosure will be thorough and complete, and will fully convey the scope of the exemplary embodiments to those skilled in the art. In the drawing figures, dimensions may be exaggerated for clarity of illustration.

It will be understood that when an element is referred to as being "on," "coupled to" or "between" two elements, it can be the only element between the two elements, or one or more intervening elements may also be present. Here, when a first element is described as being coupled to a second element, the first element may be not only directly coupled to the second element but may also be indirectly coupled to the second element via a third element. Further, some of the elements that are not essential to the complete understanding of the invention are omitted for clarity. Also, like reference numerals refer to like elements throughout. As used herein, the term "and/or" includes any and all combinations of one or more of the associated listed items.

Spatially relative terms, such as "lower," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used in this specification, specify the presence of stated features, integers, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, exemplary embodiments according to the invention will be described with reference to the accompanying drawings.

Figure 2:
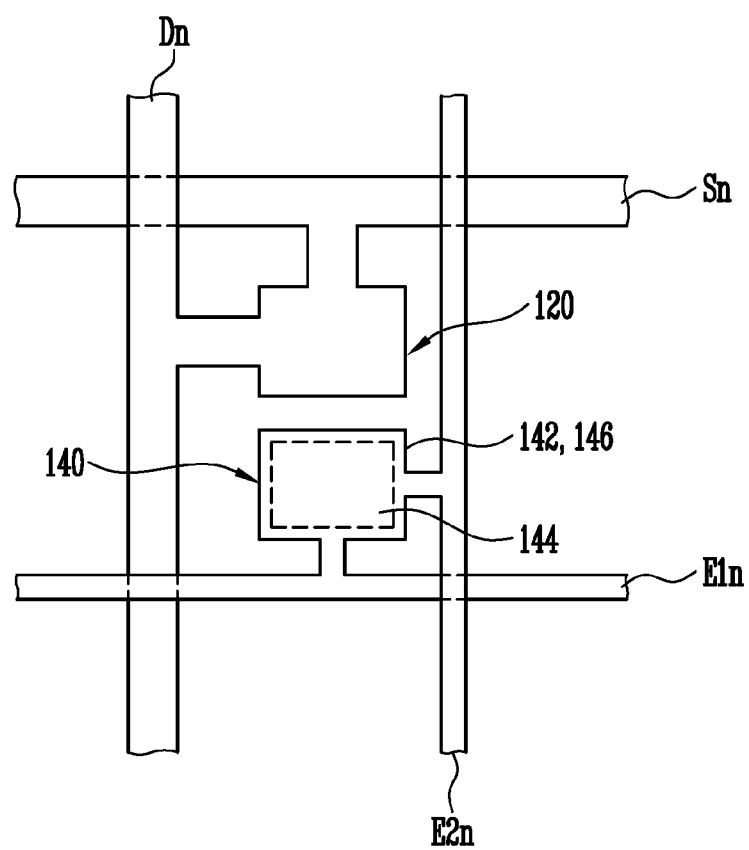
FIG. 2 is an enlarged view of portion A shown in FIG. 1.

FIG. 1 is a schematic plane view of an exemplary embodiment of a flat panel display device according to the invention. FIG. 2 is an enlarged view of portion A shown in FIG. 1.

Referring to FIG. 1, the flat panel display device includes a pixel unit 100 configured to display images, scan and data drivers 200 and 300 configured to provide signals for displaying the images, and a sensing unit 400 configured to sense the bending position and shape of the flat panel display device. The pixel unit 100 may otherwise be referred to as a display area of the flat panel display device. A plurality of regions (otherwise referred to as pixel regions) is defined in the pixel unit 100.

The pixel unit 100 includes a plurality of data lines D1 to Dn and a plurality of scan lines S1 to Sn which are arranged to intersect each other, a plurality of pixel devices 120 respectively coupled to the scan lines S1 to Sn and the data lines D1 to Dn, a plurality of first sensing lines E11 to E1n extended parallel to the scan lines S1 to Sn, a plurality of second sensing lines E21 to E2n extended parallel to the data lines D1 to Dn, and a plurality of sensing devices 140 respectively coupled to the first sensing lines E11 to E1n and the second sensing lines E21 to E2n.

The plurality of scan lines S1 to Sn is elongated in a first direction, and arranged in a second direction different from the first direction and parallel to each other. The plurality of data lines D1 to Dn is elongated in a direction intersecting the first direction in which the scan lines Sn to Sn are elongated, and arranged parallel to each other.

The plurality of pixel devices 120 is arranged, for example, in a matrix form and respectively coupled to the scan lines S1 to Sn and the data lines D1 to Dn. A pixel device 120 may include an organic light emitting device having an organic light emitting layer interposed between two electrodes, e.g., first and second electrodes, or may include a liquid crystal device having a liquid crystal layer interposed between two electrodes, e.g., first and second electrodes. The pixel device 120 may further include a thin film transistor and a capacitor, which are configured to drive the pixel device 120.

The plurality of first sensing lines E11 to E1n is elongated in the first direction, and arranged parallel to each other and the scan lines S1 to Sn. The first sensing lines E11 to E1n are respectively between adjacent scan lines, such that the first sensing lines E11 to E1n alternate with the scan lines S1 to Sn.

The plurality of second sensing lines E21 and E2n is elongated in the direction intersecting the first direction, and arranged parallel to each other and the data lines D1 to Dn. The second sensing lines E21 and E2n are respectively between adjacent data lines D1 to Dn, such that the second sensing lines E21 and E2n alternate with the data lines D1 to Dn.

The first sensing lines E11 to E1n and the second sensing lines E21 to E2n may include a transparent conductive material, e.g., at least one material selected from silver (Ag) nano tube, Ag nano wire, carbon nano tube ("CNT"), graphene, indium tin oxide ("ITO"), indium zinc oxide ("IZO"), gallium indium zinc oxide ("GIZO"), indium tin zinc oxide ("ITZO"), hafnium indium zinc oxide ("HfIZO"), Ag, MgAg and YbAg, such as a stack of one or more of the aforementioned materials, e.g., ITO/Ag, ITO/Ag/ITO, etc.

Referring to FIG. 2, a sensing device 140 includes a first electrode 142 coupled to a first sensing line E1n, a piezoelectric layer 144 disposed on the first electrode 142, and a second electrode 146 disposed on the piezoelectric layer 144 and coupled to a second sensing line E2n. The resistance of the piezoelectric layer 144 is changed depending on the size of a pressure applied thereto in a state in which a predetermined voltage is applied to the first and second electrodes 142 and 146.

The piezoelectric layer 144 may include at least one organic piezoelectric material selected from poly vinylidene fluoride ("PVDF"), PVDF-co-trifluoroethylene ("TrFE"), TrFE, polyurea, polyimide and nylon. The piezoelectric layer 144 may include at least one inorganic piezoelectric material selected from $BaTiO_3$ and lead zirconate titanate ("PZT"). In an exemplary embodiment of providing the piezoelectric layer 144, where the piezoelectric layer 144 includes the inorganic piezoelectric material, a relatively high-temperature process is required or the productivity of the finally formed piezoelectric layer 144 may be lowered. Hence, in exemplary embodiments, the piezoelectric layer 144 includes the organic piezoelectric material for which a relatively low-temperature process us used and has high productivity, but the invention is not limited thereto.

The scan driver 200 is disposed at a first side of the pixel unit 100, and is coupled to the plurality of scan lines S1 to Sn extended from the pixel unit 100. The scan driver 200 receives a control signal input from outside the flat panel display device and generates a scan signal, thereby providing the generated scan signal to the scan lines S1 to Sn.

The data driver 300 is disposed at a second side of the pixel unit 100 different from the first side, and is coupled to the plurality of data lines D1 to Dn extended from the pixel unit 100. The data driver 300 receives a control signal and image data, input from the outside of the flat panel display device, and generates a data signal, thereby providing the generated data signal to the data lines D1 to Dn.

Where the flat panel display device is bent or deformed at a position thereof, the sensing unit 400 senses a change in voltage or current which is sensed by a sensing device 140 at a corresponding position, thereby detecting the bending position and shape of the flat panel display device.

In one exemplary embodiment, for example, where a predetermined portion of the flat panel display device is bent, the current or voltage flowing through a sensing device 140 at the position with the smallest curvature radius is greater than that flowing through a sensing device 140 at the position with a relatively large curvature radius. Hence, the current or voltage values sensed by sensing devices 140 of the deformed portion are detected and analyzed, thereby detecting the bending position and shape of the flat panel display device.

Although not shown in the drawings, the sensing unit 400 may include a power supply circuit, a comparator, a logic circuit, etc. so as to perform the function described above. Further, the scan driver 200 and/or the data driver 300 may include a portion or an entire of the sensing unit 400, in contrast to the sensing unit 400 shown as a separate element from both the scan driver 200 and the data driver 300 in FIG. 2.

Figure 3:
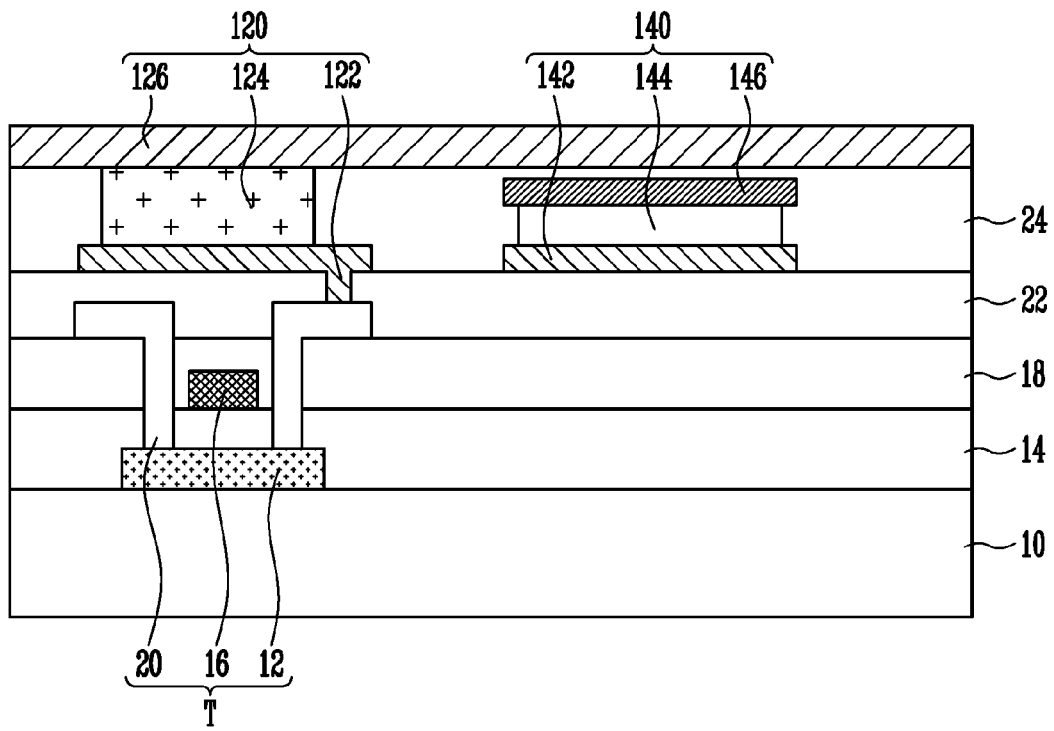
FIG. 3 is a cross-sectional view of an exemplary embodiment of a pixel device and a sensing device of a flat panel display device, according to the invention.
Figure 4:
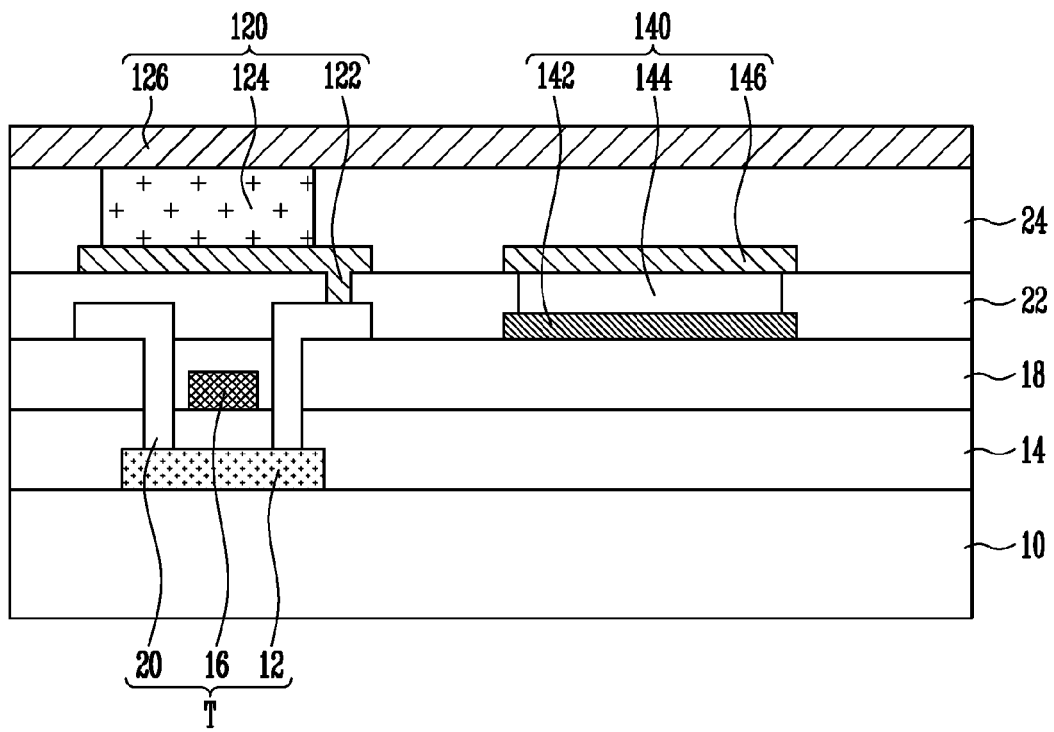
FIG. 4 is a cross-sectional view of another exemplary embodiment of a pixel device and a sensing device of a flat panel display device, according to the invention.

FIGS. 3 and 4 are respective cross-sectional views of exemplary embodiments of a pixel device and a sensing device of a flat panel display device, according to the invention. Those structures in FIG. 3 and/or FIG. 4 may be employed as the pixel device 120 and the sensing device 140, shown in FIG. 1, but the invention is not limited thereto.

Referring to FIG. 3, the pixel device 120 and the sensing device 140 are disposed adjacent to each other on a substrate 10. The substrate 10 is a flexible substrate, and may include a thin-film form of glass, plastic, metal, etc. Although not shown in the drawings, a silicon oxide layer (SiOx), silicon nitride layer (SiNx), aluminum oxide layer (AlOx), organic layer or buffer (not shown) may be disposed on the substrate 10, in a monolayer or in a multi-layered form such as a stacked structure of at least one of the foregoing materials.

The pixel device 120 includes a first electrode 122, an organic light emitting layer 124 and a second electrode 126, and the first electrode 122 may be physically and/or electrically coupled to a thin film transistor T. The thin film transistor T includes a semiconductor layer 12 disposed on the substrate 10, a gate electrode 16 insulated from the semiconductor layer 12 by a gate insulating layer 14, and source and drain electrodes 20 coupled to the semiconductor layer 12. The source and drain electrodes 20 are spaced apart from each other with respect to the gate electrode 16.

An insulating layer 18 is disposed on the gate insulating layer 14. An opening is defined in the gate insulating layer 14 and the insulating layer 18, to form a contact hole which exposes the semiconductor layer 12. The source and drain electrodes 20 are respectively coupled to the semiconductor layer 12 through contact holes defined in the gate insulating layer 14 and the insulating layer 18.

A planarization layer 22 is disposed on the substrate 10 and the thin film transistor T, and the pixel device 120 is disposed on the planarization layer 22. A via hole is defined in the planarization layer 22 overlapping the source or drain electrode 20, and exposes the source or drain electrode 20. The first electrode 122 of the pixel device 120 is coupled to the source or drain electrode 20 through the via hole defined in the planarization layer 22.

The sensing device 140 includes a first electrode 142, a piezoelectric layer 144 and a second electrode 146. Where the sensing device 140 is disposed on the planarization layer 22, the first electrode 142 of the sensing device 140 may be disposed on the same plane as the first electrode 122 of the pixel device 120. The first electrodes 122 and 142 may include a same material and/or be in a same layer of the flat panel display device. The second electrode 146 of the sensing device 140 may be electrically insulated from the second electrode 126 of the pixel device 120 by a pixel defining layer 24. The pixel defining layer 24 is configured to define a light emitting region, such as in an opening, where the light emitting region includes the first electrode 122 therein.

According to one exemplary embodiment, a pixel region may be defined by the plurality of scan lines Sn and the plurality of data lines Dn, but the invention is not limited thereto. The sensing device 140 is disposed in each pixel region of the pixel unit 100. Where the second electrode 126 of the pixel device 120 is a common electrode in the flat panel display device, the first and second electrodes 142 and 146 of the sensing device 140 can be overlapped with the second electrode 126 of the pixel device 120.

The first electrode 142, the piezoelectric layer 144 and the second electrode 146 of the sensing device 140, may all include a transparent material. Hence, although the first electrode 142, the piezoelectric layer 144 and the second electrode 146 are overlapped with the second electrode 126 of the pixel device 120, the first electrode 142, the piezoelectric layer 144 and the second electrode 146 effectively have no influence on transmittance.

In an exemplary embodiment, a cross-sectional thickness of the piezoelectric layer 144 may be in a range of about of 0.1 micrometer (μm) to about 3.0 μm. A cross-sectional thickness of the planarization layer 22 and/or the pixel defining layer 24 is in a range of about 0.3 μm to about 4.0 μm. The thickness of the piezoelectric layer 144 may be minimized to maintain electrical characteristics thereof, without compromising the flatness thereof due to an influence of the structure the sensing device 140 thereon.

FIG. 4 illustrates a structure in which the second electrode 146 of the sensing device 140 is disposed on the same plane as the first electrode 122 of the pixel device 120. That is, the second electrode 146 of the sensing device 140 may include a same material as or be in a same layer as that of the first electrode 122 of the pixel device 120.

In an exemplary embodiment of manufacturing a flat panel display device, after the source and drain electrodes 20 of the thin film transistor T are formed (e.g., provided), the first electrode 142 and the piezoelectric layer 144 of the sensing device 140 are provided on the insulating layer 18. After the planarization layer 22 is provided on the substrate 10 including the source and drain electrodes 20 and the piezoelectric layer 144, an upper surface of the piezoelectric layer 144 is exposed by the planarization layer 22, and the second electrode 146 is provided on the piezoelectric layer 144.

As described above, in the illustrated exemplary embodiment, the sensing device 140 and the pixel device 120 can be simultaneously provided in the pixel region, and a plurality of sensing devices 140 can be arranged, together with the plurality of pixel devices 120, in the matrix form.

By way of summation and review, one or more exemplary embodiment of the flat panel display device according to the invention includes an array of pixel devices arranged in a matrix form and an array of sensing devices arranged in the matrix form. Since a sensing device is disposed in each pixel region in which a pixel device is disposed, sensing of the bending position and shape of the flat panel display device is improved. Accordingly, the flat panel display device recognizes a user's command by sensing the shape of deformation caused by bending or touch applied to the flat panel display, thereby improving the convenience of using and extending the functions of the flat panel display for the user.

Exemplary embodiments have been disclosed herein, and although specific terms are employed, such terms are used and are to be interpreted in a generic and descriptive sense only and not for purpose of limitation. In some instances, as would be apparent to one of ordinary skill in the art as of the filing of the application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the invention as set forth in the following claims.

What is claimed is:

1. A flat panel display device, comprising:
a plurality of scan lines elongated in a direction;
a plurality of data lines elongated to intersect the plurality of scan lines;
a plurality of pixel devices respectively coupled to the plurality of scan lines and the plurality of data lines, each pixel device comprising an optical material between two electrodes;
a plurality of first sensing lines elongated parallel to the scan lines;
a plurality of second sensing lines elongated parallel to the data lines; and
a plurality of sensing devices respectively coupled to the plurality of first sensing lines and the plurality of second sensing lines, each sensing device comprising a piezoelectric layer between two electrodes,
wherein an electrode among the two electrodes of the pixel device is in a same plane as an electrode among the two electrodes of the sensing device, and the same-plane electrodes are electrically insulated from each other.

2. The flat panel display device of claim 1, wherein each pixel device comprises:
a first electrode;
the optical material comprising an organic light emitting layer on the first electrode; and
a second electrode on the organic light emitting layer.

3. The flat panel display device of claim 1, wherein each pixel device comprises:
a first electrode;
the optical material comprising a liquid crystal layer on the first electrode; and
a second electrode on the liquid crystal layer.

4. The flat panel display device of claim 1, wherein each sensing device comprises:
a first electrode coupled to a first sensing line among the plurality of first sensing lines;
the piezoelectric layer on the first electrode; and
a second electrode on the piezoelectric layer and coupled to a second sensing line among the plurality of second sensing lines.

5. The flat panel display device of claim 4, wherein the piezoelectric layer comprises at least one material selected from poly vinylidene fluoride (PVDF), PVDF-co-trifluoroethylene (TrFE), TrFE, polyurea, polyimide and nylon.

6. The flat panel display device of claim 4, wherein the piezoelectric layer comprises at least one material selected from $BaTiO_3$ and lead zirconate titanate (PZT).

7. The flat panel display device of claim 4, wherein a thickness of the piezoelectric layer is in a range from about 0.1 micrometer to about 3.0 micrometers.

8. The flat panel display device of claim 4, wherein the two electrodes of the sensing device are both overlapped with one of the two electrodes of the pixel device.

9. The flat panel display device of claim 1, further comprising a sensing unit coupled to the plurality of first sensing lines and the plurality of second sensing lines.

10. The flat panel display device of claim 9, further comprising:
a scan driver coupled to the plurality of scan lines; and
a data driver coupled to the plurality of data lines,
wherein the scan driver or the data driver comprises a portion of the sensing unit.

11. The flat panel display device of claim 1, wherein the plurality of first sensing lines and the plurality of second sensing lines comprise a transparent conductive material.

12. The flat panel display device of claim 11, wherein the transparent conductive material comprises at least one material selected from silver (Ag) nano tube, Ag nano wire, carbon nano tube, grapheme, indium tin oxide, indium zinc oxide, gallium indium zinc oxide, indium tin zinc oxide, hafnium indium zinc oxide, Ag, MgAg and YbAg.

13. The flat panel display device of claim 1, wherein the flat panel display device is a flexible flat panel display device.

14. The flat panel display device of claim 1, further comprising a plurality of pixel regions in which an image is displayed,
wherein a sensing device among the plurality of sensing devices is in each pixel region among the plurality of pixel regions, in which a pixel device among the plurality of pixel devices is disposed.

* * * * *